Patented July 21, 1931

1,815,655

UNITED STATES PATENT OFFICE

HOWARD W. MATHESON, OF MONTREAL, QUEBEC, CANADA, ASSIGNOR TO CANADIAN ELECTRO PRODUCTS COMPANY, LIMITED, OF MONTREAL, CANADA

PLASTIC AND SOLUBLE DERIVATIVE OF CELLULOSE

No Drawing. Application filed May 4, 1926. Serial No. 106,749.

This invention relates broadly to compounds of cellulose nitrates, which in the solid state resemble celluloid and which in solution in volatile solvents form lacquers, and to the art of preparing such compounds as plastics and solutions, and relates more particularly to compounds of this character including the esters of mandelic acid and to the preparation thereof.

It has been discovered that the esters of mandelic acid are excellent non-volatile solvents or plasticizing agents for cellulose nitrates, such as pyroxylin, and that nitrocellulose mixtures containing these esters are capable of solution in the solvents usual in the art, such as alcohol, butyl acetate, ethyl acetate, amyl acetate, ethyl lactate and others, in the production of plastics or solutions useful as lacquers and which are capable of dilution in the diluents usual in the art. It has also been found that the esters of mandelic acid may be used as substitutes, either in whole or in part, for plasticizing agents, such as camphor, di-butyl phthallate and others, both in plastics and in lacquer solutions.

The solid nitro-cellulose products obtained as above using mandelic acid esters, either combined with resins, coloring matter, etc. or not so combined, are of excellent quality, being non-volatile and possessing the desirable qualities of celluloid, while the films resulting from lacquers containing mandelic acid esters are found to be beneficially affected by the presence of the esters.

The present invention, therefore, embodies the use of mandelic acid esters as aforesaid and more particularly as non-volatile solvents for pyroxylin and as partial or complete substitutes for camphor or other plasticizing agents for nitro-cellulose.

In carrying out the invention for the commercial utilization of these esters, the procedure followed is that well known in the manufacture of celluloid and in the manufacture of pyroxylin solutions.

In order that the invention may be more readily comprehended, certain specific examples are given illustrating some of the modes of practice of the invention, but it must be understood that the invention is in no way confined to the particular proportions, substances or modes of treatment therein disclosed, as many variations and alterations may be made, the examples being purely explanatory and without limitative intent.

Example I 100 parts of pyroxylin, such as is used in celluloid manufacture, is admixed with 40 parts of ethyl mandelate. These materials are placed in a Werner & Pfleiderer or other suitable mixer and 60 parts of alcohol added. The mixture is agitated, with a moderate amount of heating, until solution is complete and a plastic mass obtained. Heating is continued under suitable conditions until part of the alcohol is distilled off and recovered. The mass is then taken out of the mixer, still containing a certain amount of alcohol, and rolled on heated rolls according to the ordinary practice in celluloid manufacture. The composition is then pressed into blocks and then can be cut into sheets in the usual way. After seasoning, these are polished between heated plates. The sheets thus obtained are of excellent quality and compare favorably with those made from camphor.

Example II 100 parts of pyroxylin is admixed with 30 parts of ethyl mandelate and to this material are added the usual solvents, such as butyl acetate, ethyl lactate, ethyl acetate and diluents, in any proportion desired to secure a suitable lacquer, the proportions of solvents and diluents being such as to give the desired flowing qualities. To this may be added pigments, dyes or resins as desired. The concentration and viscosity may be also arranged in known ways to suit the desired result. Suitable resins may also be advantageously added to the solution, and for certain of such the esters of mandelic acid are also excellent solvents.

Various other esters of mandelic acid may be used in a similar way, such as the esters of the other aliphatic or aromatic alcohols.

It will be obvious from the foregoing examples to those skilled in the art that the esters of mandelic acid may be used in a great variety of ways in the manufacture of plastics and solutions from derivatives of cellulose, and it is to be understood that all variations or modifications of the modes of practice herein described which fall within the scope of the following claim are contemplated as included in the invention.

Having thus described my invention, what I claim is:—

A composition of matter containing nitrocellulose and ethyl mandelate.

In witness whereof, I have hereunto set my hand.

HOWARD W. MATHESON.